(12) United States Patent
Durham et al.

(10) Patent No.: US 7,608,967 B2
(45) Date of Patent: Oct. 27, 2009

(54) SINGLE FIELD ROTOR MOTOR

(75) Inventors: Gary L. Durham, Stuart, FL (US);
Harold S. Durham, Stuart, FL (US)

(73) Assignee: Tri-Seven Research, Inc., Wichita, KS (US)

( * ) Notice: Subject to any disclaimer, the term of this patent is extended or adjusted under 35 U.S.C. 154(b) by 384 days.

(21) Appl. No.: 11/443,945

(22) Filed: May 30, 2006

(65) Prior Publication Data
US 2007/0278887 A1 Dec. 6, 2007

Related U.S. Application Data

(63) Continuation-in-part of application No. 10/547,940, filed on Sep. 2, 2006.

(51) Int. Cl.
*H02K 31/00* (2006.01)
(52) U.S. Cl. .................. 310/178; 310/180; 310/208; 310/259
(58) Field of Classification Search ......... 310/178–180, 310/156.01, 203, 208, 216, 254, 269, 259
See application file for complete search history.

(56) References Cited

U.S. PATENT DOCUMENTS

| | | | | |
|---|---|---|---|---|
| 3,950,663 A | | 4/1976 | Mead | |
| 3,995,203 A | * | 11/1976 | Torok | 318/701 |
| 4,348,605 A | | 9/1982 | Torok | |
| 4,698,537 A | * | 10/1987 | Byrne et al. | 310/168 |
| 4,710,665 A | * | 12/1987 | Kilgore et al. | 310/219 |
| 4,947,066 A | * | 8/1990 | Ghibu et al. | 310/49 R |
| 5,111,095 A | * | 5/1992 | Hendershot | 310/168 |
| 5,146,127 A | * | 9/1992 | Smith | 310/166 |
| 5,554,903 A | * | 9/1996 | Takara | 310/266 |
| 5,682,073 A | * | 10/1997 | Mizuno | 310/165 |
| 5,923,142 A | | 7/1999 | Li | |
| 2002/0135253 A1 | * | 9/2002 | Sebastian et al. | 310/156.48 |
| 2004/0119356 A1 | | 6/2004 | Anwander | |

FOREIGN PATENT DOCUMENTS

| | | |
|---|---|---|
| GB | 2 282 708 A | 4/1995 |
| WO | WO 1998/15048 A2 | 4/1998 |
| WO | WO 2005/091475 A | 9/2005 |

* cited by examiner

*Primary Examiner*—Thanh Lam
(74) *Attorney, Agent, or Firm*—Young Basile Hanlon & MacFarlane, P.C.

(57) ABSTRACT

A single field rotor motor comprising a rotor mounted for rotation with respect to a stator. The stator has a plurality of stator poles each having a coil for creating a magnetic pole force. The rotor has a plurality of circumferentially spaced salient rotor poles formed thereon, wherein the flux within the rotor maintains a constant polarity. Magnetic means are provided for creating a pair of magnetic flux fields, wherein interaction of the pair of magnetic flux fields causes the magnetic flux fields to spray radially outward with respect to the rotor, thereby creating uniform magnetic polarity on the rotor poles. Circuit means are provided for alternately charging said stator coils to alternate the polarity of a given stator pole to alternately attract and repel said rotor poles to produce rotation of said rotor.

17 Claims, 13 Drawing Sheets

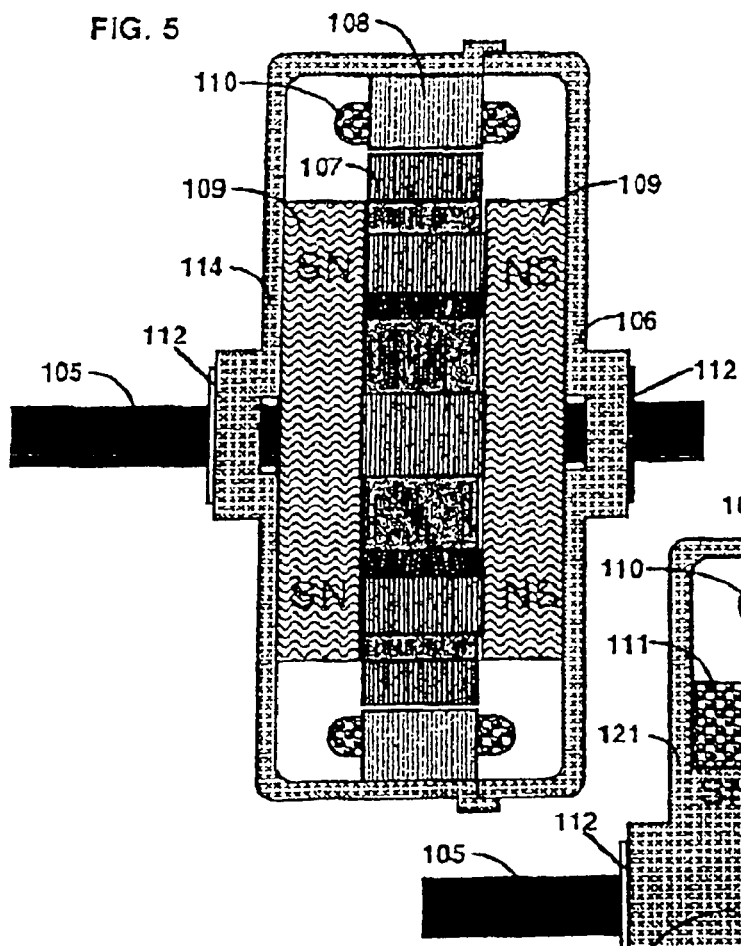
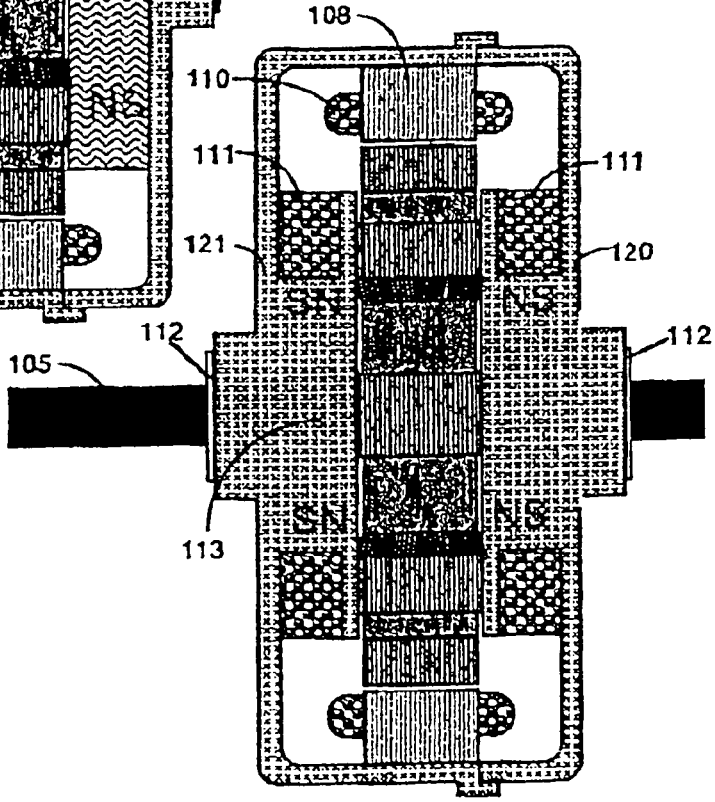

SINGLE FIELD ROTOR MOTOR

CROSS-REFERENCE TO RELATED APPLICATIONS

This application is a continuation-in-part of patent application Ser. No. 10/547,940, filed Sep. 2, 2005.

FIELD OF THE INVENTION

The invention pertains to a single field rotor motor wherein a minimum of alternating flux fields in the total flux circuit of the motor that produces the motor torque are created. The result is that the creation of a non-reversing flux field in a major portion of the stator and rotor parts creates less losses and produces greater efficiency in the overall motor operation.

DESCRIPTION OF THE RELATED ART

In typical electric motor construction and theory, alternating flux fields are created, and various systems are utilized to unbalance these flux fields so that a rotation of the motor rotor would occur. Reversing flux fields are created in conventional electric motor devices, and because of the necessity to overcome non-work flux fields, the efficiency of the motor is adversely affected. Over the years, various structural and theoretical systems have been produced in the electric motor art to overcome such conventional inefficiencies, but heretofore, electric motor efficiencies have not been high, especially in fractional horsepower motors, commonly not reaching better than 50% at best, and known electric motors are inefficient in converting electrical to mechanical energy.

SUMMARY OF THE INVENTION

It is known that if the area within an electric motor where the alternating flux used in the motor stator is kept small, increased efficiency will be experienced, as there is less metal mass involved in the alternating flux area, and the flux paths that are being alternated are shorter, and therefore, less core losses occur than in a motor where larger areas of the total flux torque circuit are alternated.

To achieve these objectives, it is necessary that a motor configuration be used which makes major departures from common torque configurations and from the way flux is established and manipulated in the stator and rotor parts in order to create a spinning magnetic field that does not have a changing polarity.

The motor herein described, designated as a single field rotor motor, has such a configuration as described above. As set forth below, the unique construction of the motor of the invention will be appreciated, as well as the unique configuration of the non-alternating field used to create rotor and stator saturation and create the primary torque power, and the minimal area and mass in this total torque path that actually has to alternate is achieved to create the unique interplay of fields which spin this non-alternating torque field in the rotor torque area of the motor.

The configuration of the non-alternating flux of the single field rotor motor of the invention is very different from traditional electric motors. First, the flux used to create the primary torque in the rotor torque area of the motor is not created by either a cross-field arrangement between stator poles in the rotor torque area or by a field oriented so that its path runs radially in the stator core and manifests its opposite polarity through various pole faces in this same torque area. Rather, the primary flux which creates torque in the motor of the invention travels axially from each axial face of the rotor, toward the axial mid-point of the rotor. Thus, two flux fields are created 180° out of phase one to the other along the axis. When this out-of-phase flux from the endbells meets in the rotor torque area of the motor (in the core of the laminated rotor), the natural effect created by the flux itself is for this flux to spray radially in a plane perpendicular to the axis of the motor. The axially spaced orientation of the rotor lamination also encourages the same effect, as the flux is turned by each lamination of the rotor outward to the rotor's radial edge toward the salient poles, which all have the same polarity. This creates a very balanced flux density in each rotor pole as compared to any of the other rotor poles and creates an excellent ratio of flux concentration or focusing. This allows for excellent saturation characteristics, and since the rotor never changes polarity while the motor is running, this saturation remains at peak in the rotor and its poles at all times.

When the flux exits the radial faces of the rotor poles, it crosses a small air-gap between those faces and the faces of the laminated stator poles. These laminated stator poles are always twice the number of the rotor poles, as the rotor poles faces are, together, equal to about 50% of the total outer diameter of the rotor, with the spaces between the salient poles being equal, together, to about 50% of that same outer diameter. This laminated section of the stator is on its outer circumference fitted into a ferromagnetic or equivalent housing of solid construction which joins to the ferromagnetic endbells, or the endbells themselves are actually formed so they meet in the center of the motor and join, forming both the housing and the endbells.

The present invention positions magnets onto the radial face of the rotor using them to compose salient rotor poles and intervening spaces so they create near equal pole face surfaces, and between pole space surfaces, around the outer diameter of the rotor. All the magnets are so bonded to the rotor that they have the same magnetic polarity on their outer radial face as all the other magnet poles on the rotor, thus creating again a rotor with a single-field (polarity) on all its poles that never alternates as the motor operates.

The radial/axial return path for the flux from the magnets induces the magnet flux to return to the rotor by means of the stator poles and either through the stator housing endbells or, alternatively, by means of the stator pole extensions. Thus, the flux path has one alternately expanding and diminishing air gap, which is between the stator poles and the rotor poles, and one non-expanding air gap between the rotor and the stator housing endbells or the stator pole extensions.

One of the benefits of this design is to place the magnets directly on the rotor side of the expanding air gap between the stator poles and the rotor poles, thus getting a higher degree of the magnet flux into the torque area air gap between the stator poles and the rotor poles which are now actually fabricated from magnets. This increases the influence of the magnet flux on the stator poles, and since the rotor poles all have the same magnetic polarity on the outer face of the rotor poles, and the stator poles are so designed and positioned as to provide a motor steel return path for the magnet flux by means of the housing endbells, or the stator pole extensions, to the other face of the magnets which are bonded on the rotor, the flux from the rotor magnets exert the same polarity in relation to the rotor's outer diameter on all the stator poles. This results in the stator poles having an in-phase magnetic polarity induced into them by the rotor magnet-poles. And since there is no alternate magnetic polarity induced from the rotor magnets, the influence of the rotor magnets tend to hold the stator poles, the stator housing, or stator pole extensions, in flux circuits axially and radially in-phase with the rotor magnets. This results in the stator coils, wound around each stator pole, producing either an enhancement to this magnetic in-phase influence or inducing a cancellation force into a stator pole causing it to repel the rotor magnet poles but not greatly reverse the polarity of the stator pole which is thus repelling the magnet rotor pole. This is because the magnetic field induced by the stator coils is only strong enough to cancel the magnetic influence of the rotor magnet poles but not to reverse the stator pole mass when in the influence of the rotor magnets. This keeps the eddy currents to a minimum as the motor steel in the stator poles is taken either to an enhanced in-phase condition magnetically in relation to the rotor magnets or taken to a near neutral magnetic condition due to near equal opposite magnetic influence from the stator coils and the rotor magnets.

However, since every other intervening stator pole has its in-phase magnetic orientation in relation to the rotor pole magnet flux enhanced so that the rotor magnet poles are induced to "see" a large magnetic shunting potential only at the in-phase stator poles, which is every other stator pole, and a large magnetic reluctance at every other stator pole which is induced to be magnetically out-of-phase, a spinning non-alternating in-phase magnetic shunting path for the rotor magnet flux is created between the rotor magnet poles and the stator poles. As the stator coils alternate, as described in the first patent, the rotor is induced to rotate due to this spinning, non-alternating, in-phase magnetic shunting path that is created between the stator poles and the rotor poles. The method of creating torque with this flux configuration is by means of phase coils on the laminated stator poles. As previously indicated, the stator poles are twice the number of the rotor poles. And, as all the flux from the magnets cross the air gap between the outer circumferential face of the rotor magnets into the poles of the stator and then by means of the stator pole extensions or stator housing endbells through the axial air gap into the side of the rotor and thus completing the magnetic circuit to the opposite magnetic face of the rotor magnets which are bonded to the rotor, this creates the same kind of torque configuration as previously disclosed. It is thus possible to cause rotation of the rotor by alternately making one set, of every other stator pole, in-phase with the torque flux from the rotor magnets while the other set, of every other stator pole, out-of-phase with the torque flux from the rotor magnets. This causes the flux to constantly seek the in-phase poles to keep its non-alternating flux-circuit complete and thus creates a constant torque on the rotor, while at the same time the rotor poles repel the out-of-phase set of stator poles as the rotor poles have an unchanging polarity.

A unique characteristic of this motor is that the salient rotor poles are all polarized like a radial magnet and have the same magnetic pole on their radial face toward the stator pole faces. This means that as the phase coils on the laminated part of the stator reverse from in-phase to out-of-phase in relation to the polarity of the rotor magnetization, it actually creates a repulsion on the magnet rotor poles. This means that all the poles on the stator and all the poles of the rotor are contributing to the torque on the rotor in both the positive and negative electrical phases. This is very different from other magnet rotor motors which use both North and South magnet faces present on the outer circumference of the rotor to get both attention and repulsion effects in the torque. While this rotor has only a single-field and never alternates, it does not merely act like a rotary magnetic shunt between magnetically in-phase faces of stator poles but equally exerts out-of-phase repulsive torque. And unlike other salient poled rotor motors, such as switched reluctance type motors, the rotor poles never change in regard to their magnetic polarity and thus the work energy in the rotor is never destroyed and replaced by rotor poles being magnetized by the stator with alternating polarity as they rotate or the rotor mass changing its magnetic orientation as it rotates through a stator magnetic cross-field.

An alternative embodiment of the present invention is presented wherein the single-field rotor motor has a segmented stator comprised of laminated pole pieces and a housing fabricated from plastic, or other appropriate material, designed with appropriate hollows so as to hold the segmented stator poles in place.

General Description of the Stator Phase Coil Configuration for the Single Field Rotor Motor The phase coil part of the single field rotor motor can be wound three different ways. All methods are simple and give much the same performance characteristics, but each is more suitable to different production demands and circuit requirements. The more traditional method is to wind a coil on each laminated stator pole so that each coil is reverse-wound in relation to any phase coil on either side of it along the inside circumference of the stator. This is a simple alternating clockwise, counter-clockwise winding pattern. Usually, the coils are connected in series electrically so that they can all be excited together by the control circuit as shown in FIGS. 13-14. This means that every other pole will have a North magnetic polarity on its face, and the intervening poles will each have a South magnetic polarity on its face. With a single-phase control circuit which supplies a positive half-phase and a negative half-phase, the polarity of the two sets of poles is alternated as desired.

The effect is that every other stator pole is either in-phase or out-of-phase with the primary torque flux being created by the stator magnets or DC coils. This causes the rotor poles, which are half the number of the stator poles and spaced so they can only come into register with every other stator pole at any position which allows a register position of stator and rotor poles to be repelled by the one set of stator poles because they are out-of-phase with the circuit path of the primary torque flux from the stator magnets or DC coils, and to be attracted by the other set of stator poles because they are in-phase with the primary torque flux from the same source. By simply alternating the phase coils between positive and negative with a circuit which primarily controls the timing of this alteration, spinning in-phase areas on the inside face of the stator poles which is always 50% of the available stator pole face surface, which corresponds to every other stator pole face, is created. This results in the rotor constantly "chasing" these continually rotating in-phase areas and constantly repelling the rotating out-of-phase areas which are also 50% of the available stator poles surface and correspond to the other set of every other stator pole face.

One of the alternate ways of winding the phase coils is to use what may be called a "Z" coil winding. A "Z" coil winding is used with an even number of poles and is simply a passing of a winding wire through the slots of the stator in a zig-zag manner, going around and around the stator until the desired number of turns are in each slot. This, of course, means that there is really only one coil which is woven back and forth between the slots as it is placed around the circumference of the inside of the stator. As this coil reverses its direction in relation to every other slot of the stator, it creates the same alternating flux pattern on the stator poles faces. As the "Z" coil winding only loops around one side of each pole, it effectively shortens the overall length of the total in-series phase winding and thus the overall resistance. This kind of winding is also very simple for some types of production applications of this motor as a single coil of the required number of turns can be wound with a diameter which allows it to be slid into the stator slots in a "Z" manner.

The second alternate method of winding the phase coils is to use two "Z" coils, wound in the same slots but 180° opposite to each other so that the side loops of one "Z" coil loops around one side of every other stator pole (the side it loops around alternating with every pole) while the second "Z" coil winds around the opposite side of every other pole from that of the first "Z" coil. They can then be connected in parallel for one voltage, i.e. 115 volts and connected in series for a second voltage, i.e. 230 volts. Also, with this double "Z" coil method of winding the phase coils, it is easy to use a bifilar type motor circuit where two separate sets of coils are powered as DC circuits with one being positive and the other being negative in relation to each other. This allows the single field rotor motor of the invention to use very economical motor control circuits which are inexpensive as compared to H-bridge type control circuits, while at the same time offering various simple speed control methods which are continuously variable between the slowest and fastest rotation of the motor.

The single "Z" coil method of winding the phase coils is shown in FIG. 9 of the attached drawings, while the double "Z" coil method of winding is shown in attached FIG. 10.

All three methods of winding the phase coils on the stator give much the same performance and can be used according to production or circuit needs.

BRIEF DESCRIPTION OF THE DRAWINGS

The aforementioned objects and operation of the invention will be appreciated from the following description and accompanying drawings wherein:

FIG. 5 illustrates an embodiment of the single field rotor motor of the present invention using permanent magnets;

FIG. 6 is the same motor as shown in FIG. 5, except the permanent magnets have been replaced by coil cores;

DESCRIPTION OF THE PREFERRED EMBODIMENTS

Figure 1:
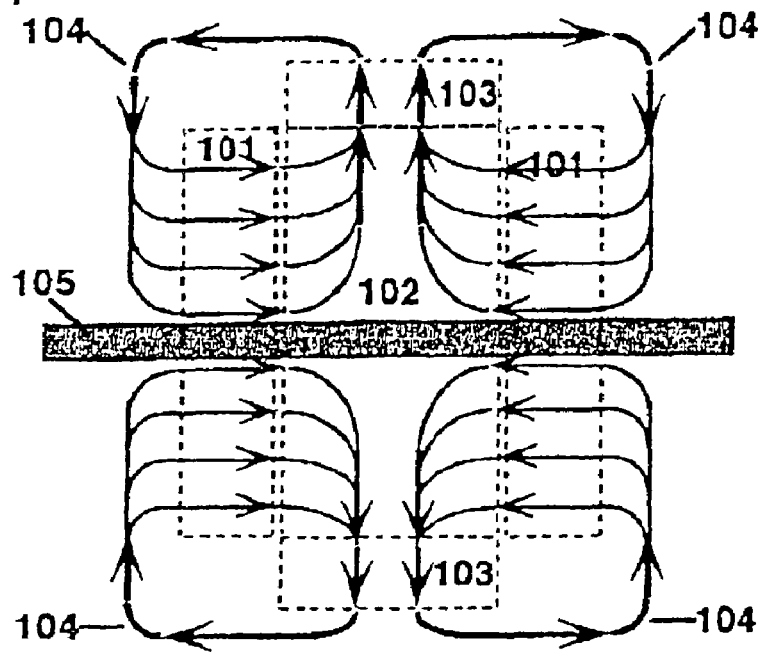
FIG. 1 illustrates a typical flux configuration in a single field rotor motor in accord with the present invention.

FIG. 1 schematically illustrates the configuration and paths of the primary torque flux in the single field rotor motor in accord with the invention regardless of whether the flux is created by permanent magnets or DC coils and cores of the stator. The areas illustrated and enclosed by dotted lines 101 are the areas where the flux originates in the magnets or DC coil cores. The area in the dotted line box 102 is the rotor-torque area of the motor where the rotor rotates and illustrates how the opposing polarity of the flux entering the rotor-torque area from opposite sides causes it to spray perpendicular to the motor axis. The rotor's laminations also are oriented perpendicular to the axis which further encourages this effect, and the laminations of the rotor become the ferrite path for the flux to travel to the circumference of the rotor where the rotor poles are formed. Areas 103 represent the areas of the stator which is laminated with poles and wound with phase coils and illustrates how the flux uses this part of the stator to pass into the solid, i.e. non-laminated, parts of the stator where arrows 104 illustrate the return of the flux by means of the non-laminated part of the stator to the opposite side of the magnets or DC coil core from which it originally existed, thus completing the flux circuits. Shaft 105 is shown in FIG. 1 in order to give perspective to the observer.

Figure 2:
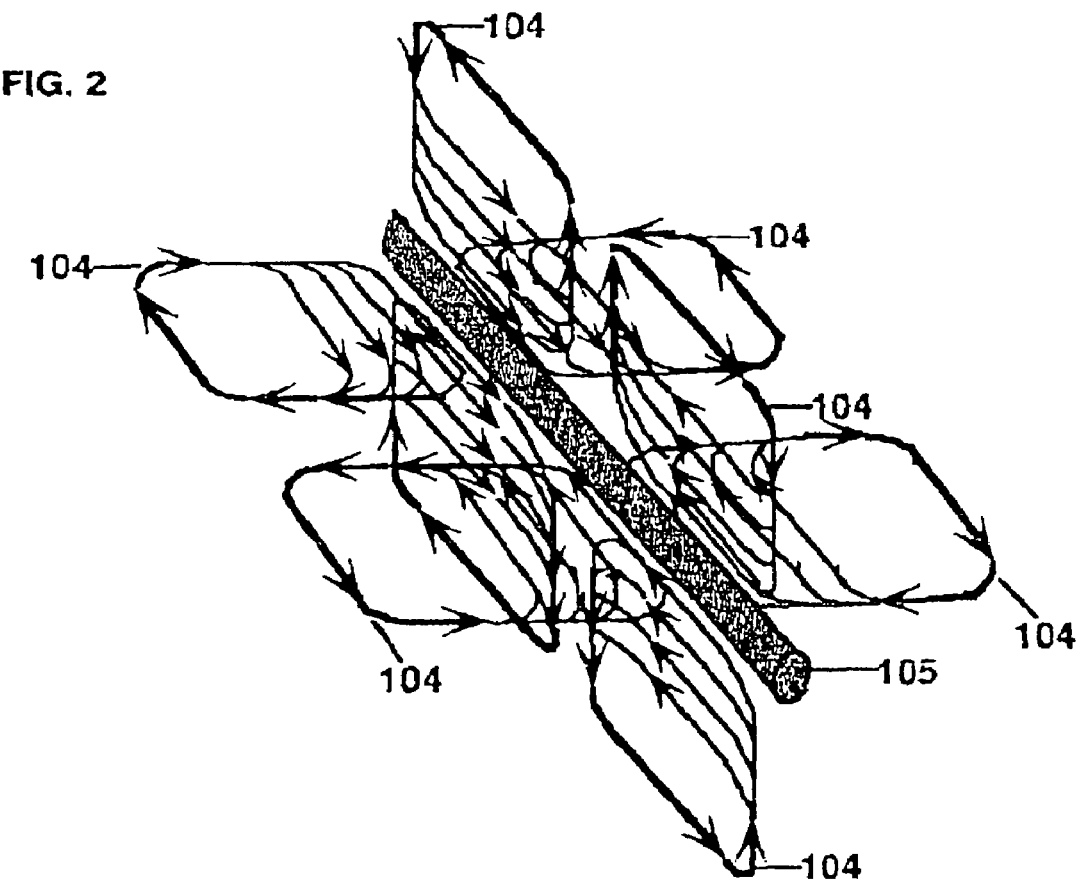
FIG. 2 is a perspective view along the plane of the axis of rotation of the flux configuration of FIG. 1.

FIG. 2 is a compromise end and axial view of the flux circuits illustrated in FIG. 1 and illustrates the substantially toroidal, 360° configuration of the flux circuits, even though there are arrows showing the flux paths only every 90° for the sake of clarity. Flux 104 and shaft 105 are indicated in order to give perspective in relation to FIG. 1.

Figure 3:
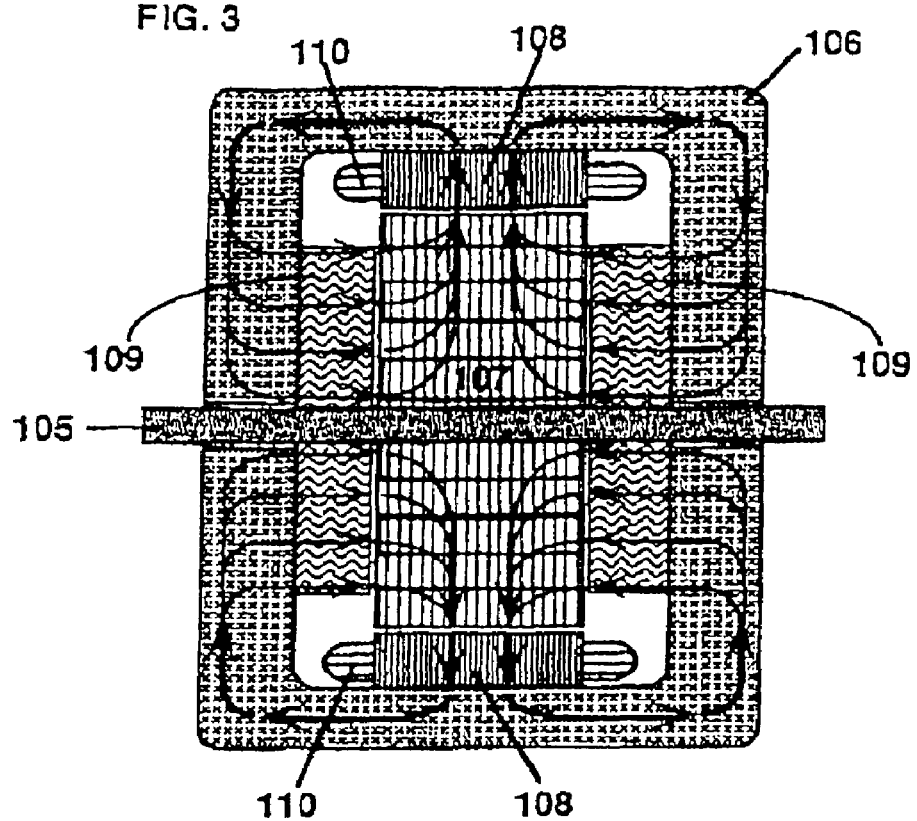
FIG. 3 is similar to FIG. 1 and illustrates the motor parts that are part of the flux path if magnets are used.

With reference to FIG. 3, which illustrates a typical single field rotor motor in accord with the present invention, and is similar in operation to the description of FIG. 1, and various parts of the motor are indicated, permanent magnets 109 are oriented so that there is a North field on both inside faces toward the rotor 107, which is laminated so that the flux travels to its circumference where the rotor poles are formed. The flux from the magnets 109 cross the unchanging minimum air-gaps between their inside faces and the sides of the rotor 107, which is mounted on the shaft 105 and enters the rotor laminations, then turns perpendicular to the axis of the motor and travels along the laminations of the rotor 107 to all 360° of the rotor circumference. It then concentrates in the rotor poles as they extend to within a few thousandths of an inch of the stator poles faces of stator laminations 108. The flux then crosses the air-gap between the rotor pole faces on the outside circumference of the rotor 107 and the inside faces of the poles of the laminated part of the stator, which is indicated by the stator laminations 108, which has phase coils 110 wound in all its slots. The flux passes through the laminations of the stator laminations 108 to its outside circumference. The outside circumference of the stator laminations 108 is press fitted into the inside circumference of stator housing 106, which is the solid and non-laminated ferromagnetic or equivalent part of the stator and endbells. The flux uses a solid stator housing 106 to return to the South face of the magnets 109, completing the flux circuit.

Figure 4:
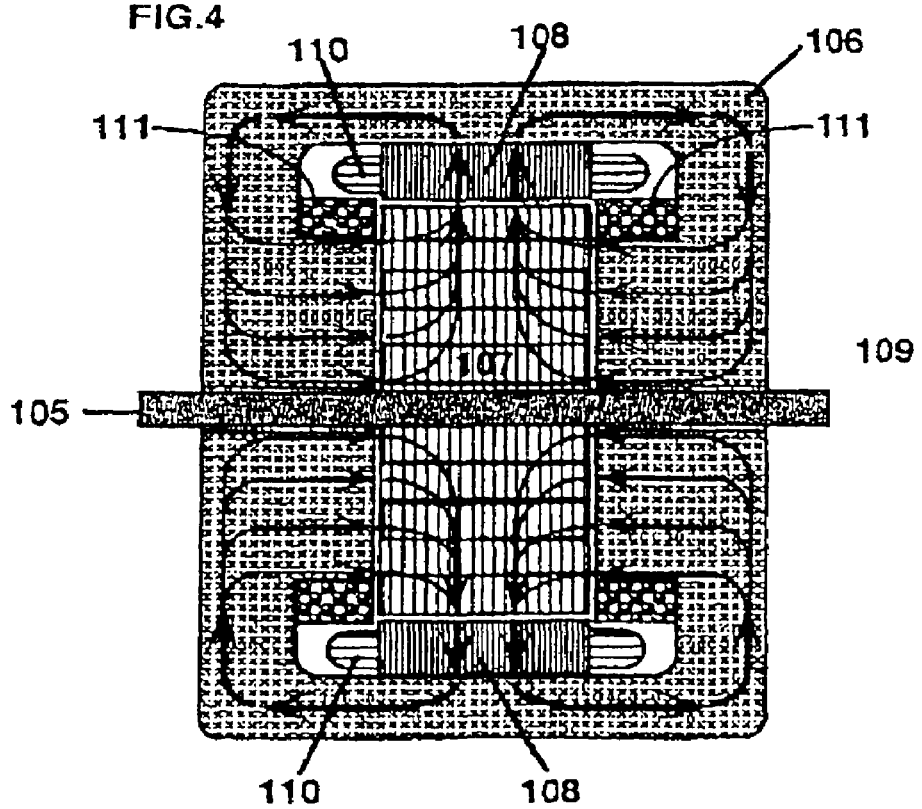
FIG. 4 is similar to FIG. 3, except a direct current (D.C.) coil is shown in place of the magnets on the stator.

FIG. 4 illustrates a motor utilizing the circuits of FIG. 3 wherein identical reference numerals indicate parts previously described. The magnets of the stator are replaced by DC coils 111 and the cores of those coils which are made part of the solid stator housing 106.

FIG. 5 shows an embodiment of the single field rotor motor of the present invention utilizing permanent magnets. The solid stator housing 106 and associated endbells 114 have the magnets 109 bonded to their inside faces so as to properly position the magnets' inside faces next to the sides of the rotor 107 with a minimum air gap. The left solid stator housing 106/endbell 114 has stator laminations 108, with phase coils 110 press fitted into it so as to position the stator pole faces properly around the rotor 107 so that rotor poles can rotate a few thousandths of an inch from the inside faces of the stator poles and come into register with every other stator pole alternately. The rotor 107 is mounted on the shaft 105 and is held in place by bearings 112 fitted into the bearing housings of the solid stator housing/endbells 106 and 114.

FIG. 6 is the same motor as illustrated in FIG. 5, except that the magnets 109 have been replaced by extending coil cores from the solid stator housing/endbells 106 and 114 such as at 113 indicated on 121. DC coils 111 are then wound on these cores to create the primary torque flux for the motor to replace the permanent magnets 109 of the embodiment of FIG. 5.

Figure 7:
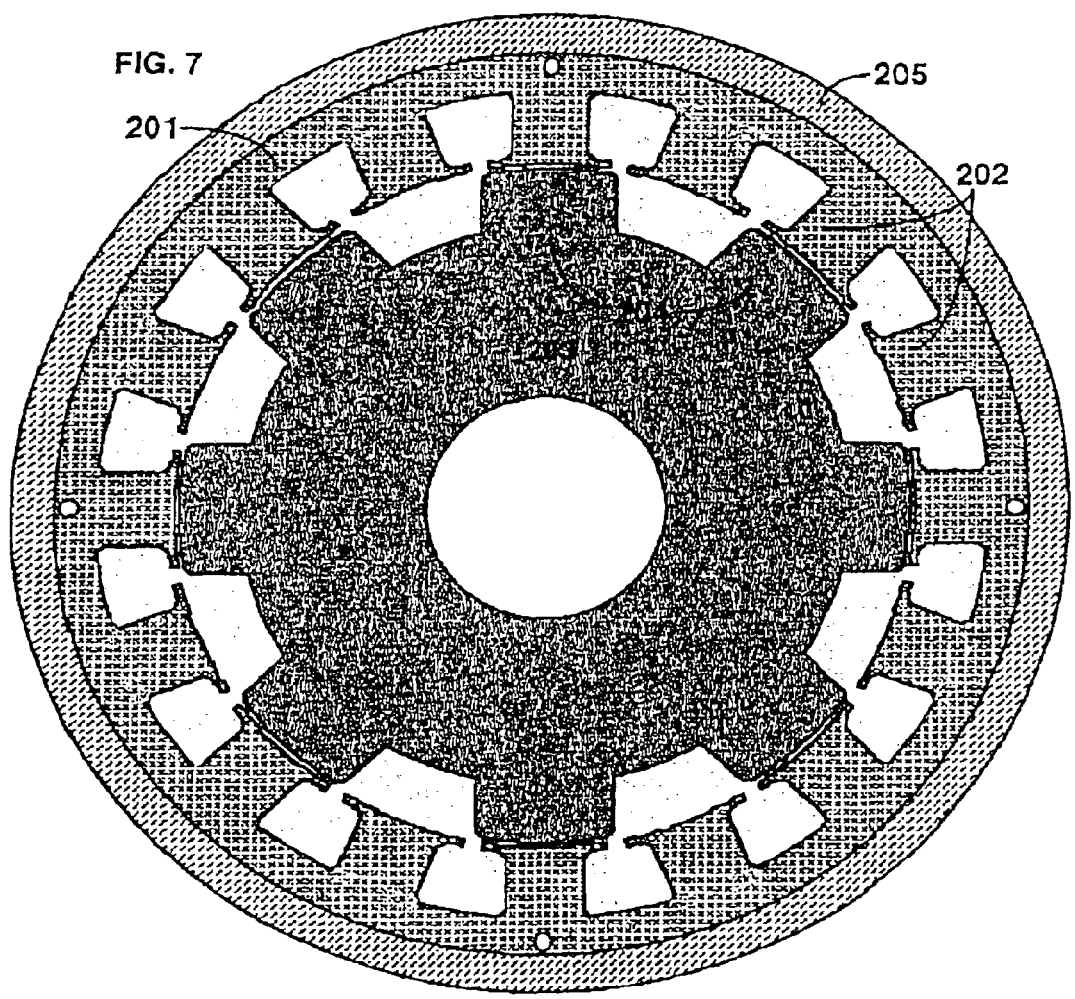
FIG. 7 is an end view of a typical single field rotor motor utilizing the concepts of the present invention.

FIG. 7 is a sectional end view of the single field rotor motor in accord with the present invention illustrating the motor parts from a different section than that previously described. Rotor 203 is illustrated with salient poles 204, which are eight in number, and sized and positioned so that they can come into register with every other pole face of the stator poles 202 of laminated stator 201. The stator poles 202 are sixteen in number and equally proportioned and spaced around the inside circumference of the stator 201 with sixteen slots between them. The stator laminations 201 are shown pressed into a solid stator/endbell 205. The stator pole faces are equal to the total inside face of the stator circumference only minus the slot openings. The rotor pole faces are equal to the face of any one pole of the stator 201 and are spaced so that they come into register with every other stator pole all at the same time.

Figure 8:
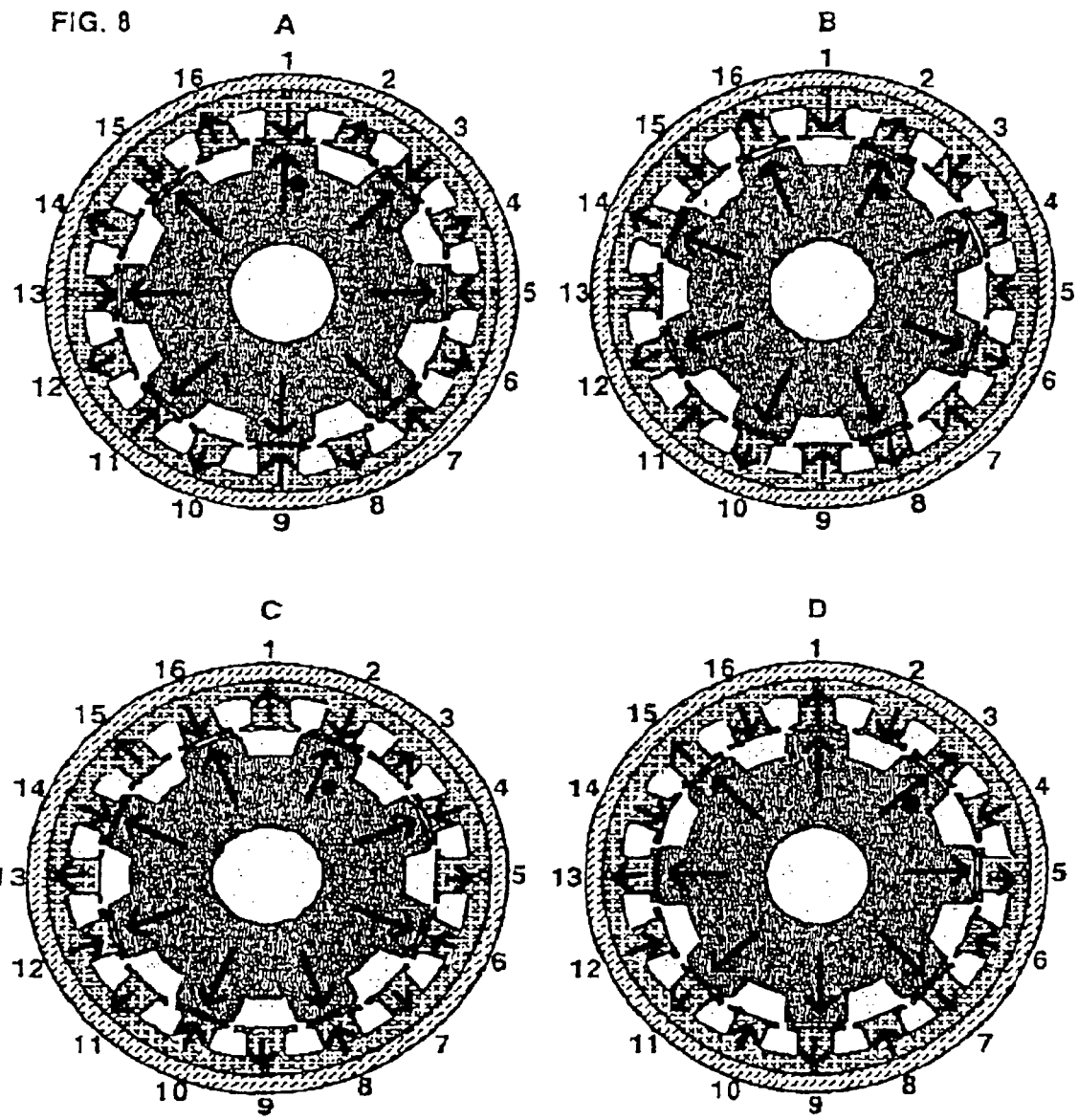
FIGS. 8A-8D illustrate the method of torque application in the single field rotor motor of the present invention.

FIGS. 8A-8D illustrate the method of torque in the single field rotor motor in accord with the present invention. In FIG. 8A, the rotor poles are shown in register with the odd numbered poles of the stator. The arrows on the odd stator poles show that the phase coils (not shown) have been energized so that the odd poles of the stator are out-of-phase magnetically with the torque flux in the rotor poles which is North on the face of all the rotor poles as indicated by the arrows, and this is coming from the magnets or DC coils of the stator, while the even number poles of the stator are energized so that they are in-phase magnetically with the flux in the rotor poles. This will cause the rotor poles to be magnetically repelled away from the odd numbered poles of the stator and attracted toward the even numbered poles of the stator. This will result in the rotor poles coming into register and magnetically in-phase with the even numbered poles as illustrated in FIG. 8B. Then, as illustrated in FIG. 8C by the change in the orientation of the arrows on the stator poles, the phase coils all reverse their polarity causing the even numbered stator poles of the stator to be out-of-phase magnetically with the torque flux in the rotor poles, which is coming from the magnets or DC coils, while the odd numbered poles of the stator are energized so that they are in-phase magnetically with the flux in the rotor poles. This will cause the rotor poles to be magnetically repelled away from the even numbered poles of the stator and attracted toward the odd numbered poles of the stator. This will result in the rotor poles coming into register and magnetically in-phase with the odd numbered poles as illustrated in FIG. 8D. This is repeated again and again by the control circuits thus causing continuous torque on the rotor.

Figure 9:
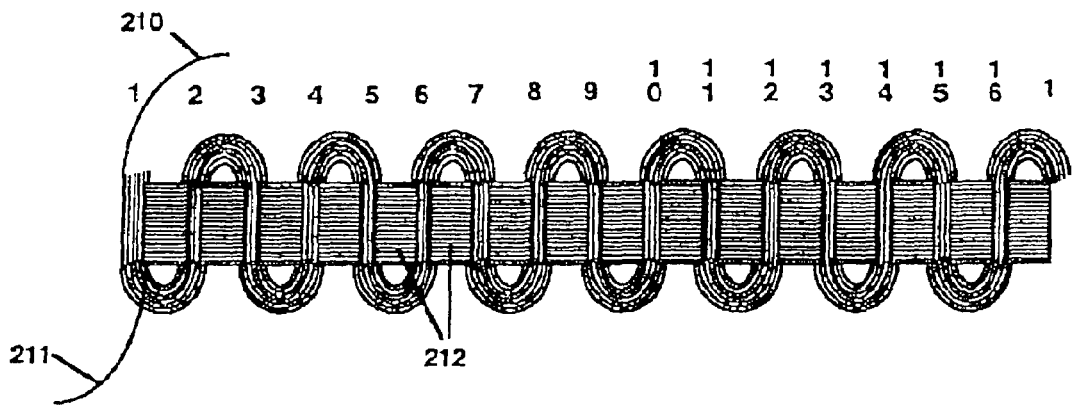
FIG. 9 illustrates an alternative winding of the phase coils in the slots of the laminated portion of the stator.

FIG. 9 illustrates the alternate way of winding the phase coils in the slots of the laminated part of the stator. Magnetic winding wire end 210 is alternately laced through the stator pole slots so that it loops around only one side of each stator pole so as to loop around the opposite side of every other stator pole. The number of turns in the slots are determined by the number of times the winding wire makes a complete trip through all the slots. When the desired number of turns is achieved, the winding wire is finished with end 211. By applying single phase current to this kind of winding, all the stator poles 212 will have alternating North and South poles on their faces in the positive half-phase and will reverse their pattern in the negative half-phase.

Figure 10:
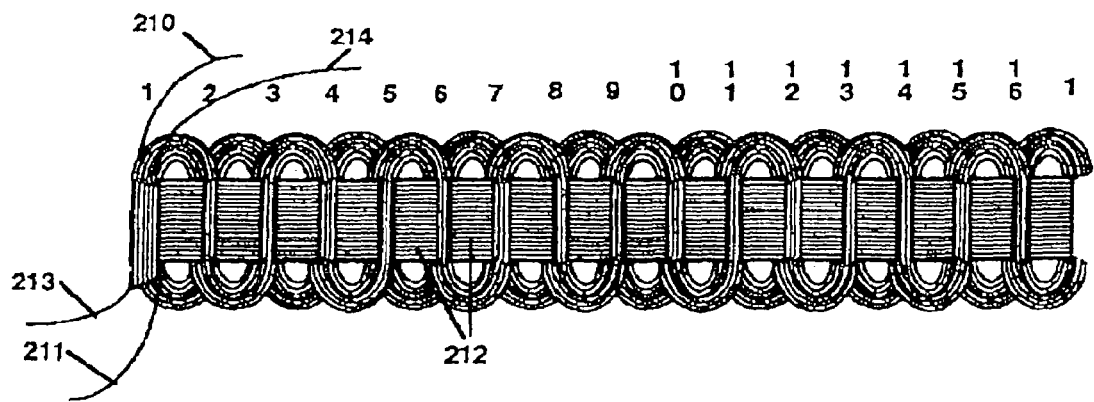
FIG. 10 is similar to FIG. 9 wherein a second winding in the opposite direction has taken place.

By winding a second winding in the same manner, only in the opposite direction so that the windings loop around the opposite sides of the stator poles from the first winding, as illustrated in FIG. 10, a bifilar phase coil configuration is formed which can be powered and controlled by a much simpler circuit which is primarily two DC circuits powered alternately, or multi-voltage options are created if the coils are used in parallel or series with a more traditional H-bridge type circuit.

Figure 11:
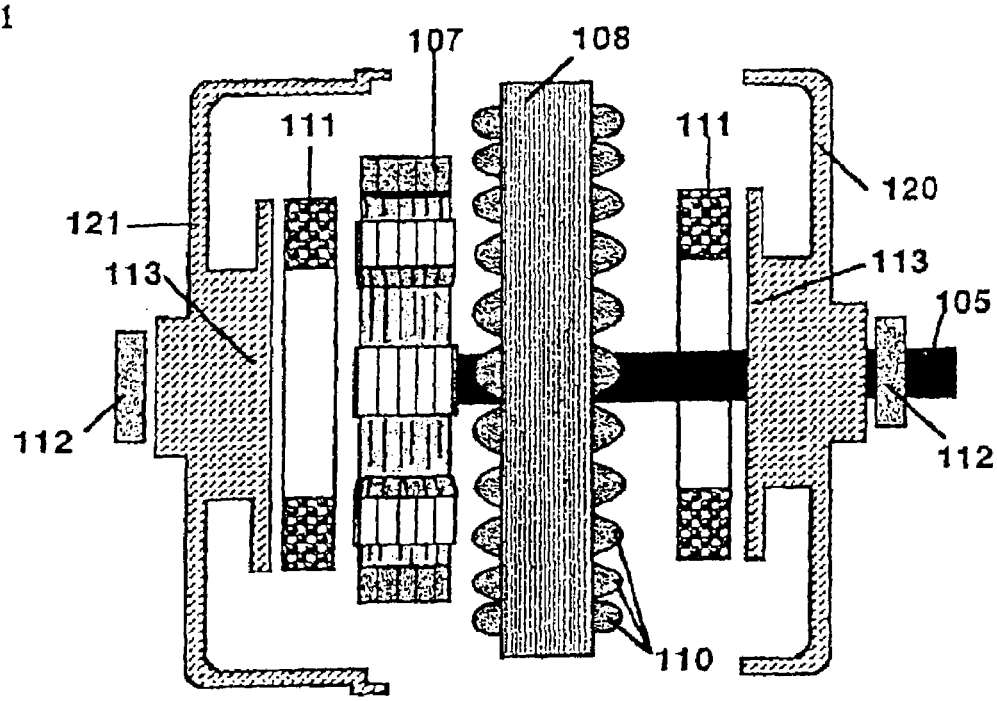
FIG. 11 is an exploded view of the motor illustrated in FIG. 6.

FIG. 11 is an expanded view of the motor illustrated originally in FIG. 6. The solid stator/endbells 120 and 121 have coil cores formed on their inside faces, as indicated at 113. The DC coils 111 would be wound on these cores respectively to create the primary torque flux in the motor. The rotor 107 is a rotor laminated from soft motor steel with salient poles spaced and proportioned so that they can come into register with every other pole of the laminated stator 108 as it rotates. The laminated part of the stator 108 is illustrated with phase coils 110 wound on its poles which may be a traditional type winding with a single coil around each pole or with the "Z" type windings illustrated in FIGS. 9-10.

Figure 12:
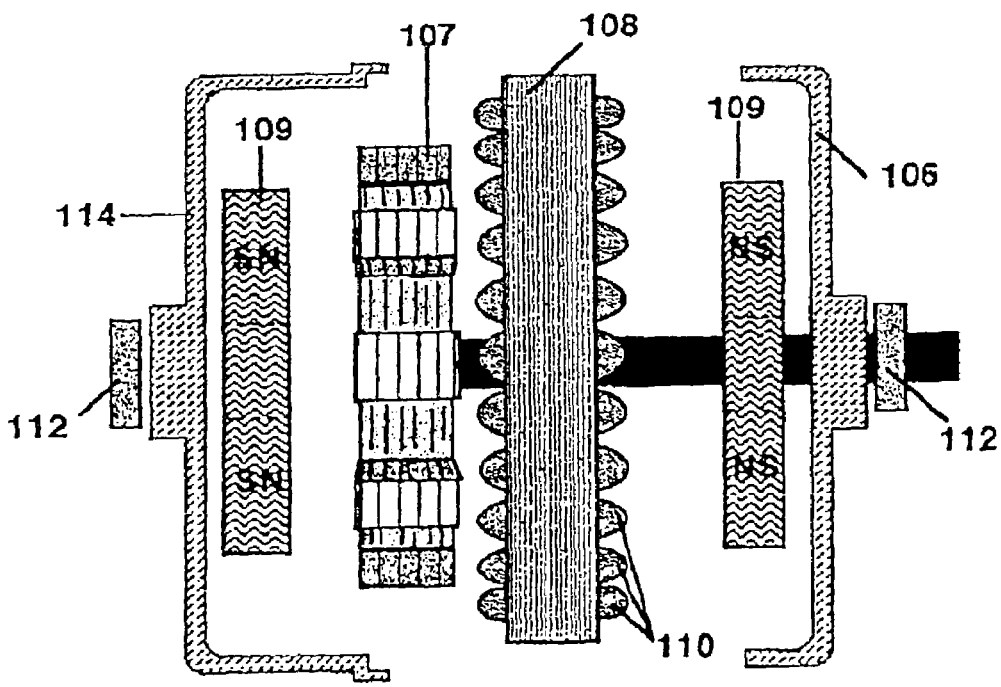
FIG. 12 is an exploded view of the permanent magnet motor illustrated in FIG. 5.

FIG. 12 is an expanded view of FIG. 5, which is the same motor as FIGS. 6 and 11, except that magnets 109 are used to create the primary torque flux in the motor rather than the DC coils. Accordingly, the solid stator housing/endbells 106 and 114 are fabricated without the DC coil cores which the other version is shown having and instead has the magnets 109 bonded to the inside face of the solid stator/endbell in place of the core and DC coil.

Figure 13:
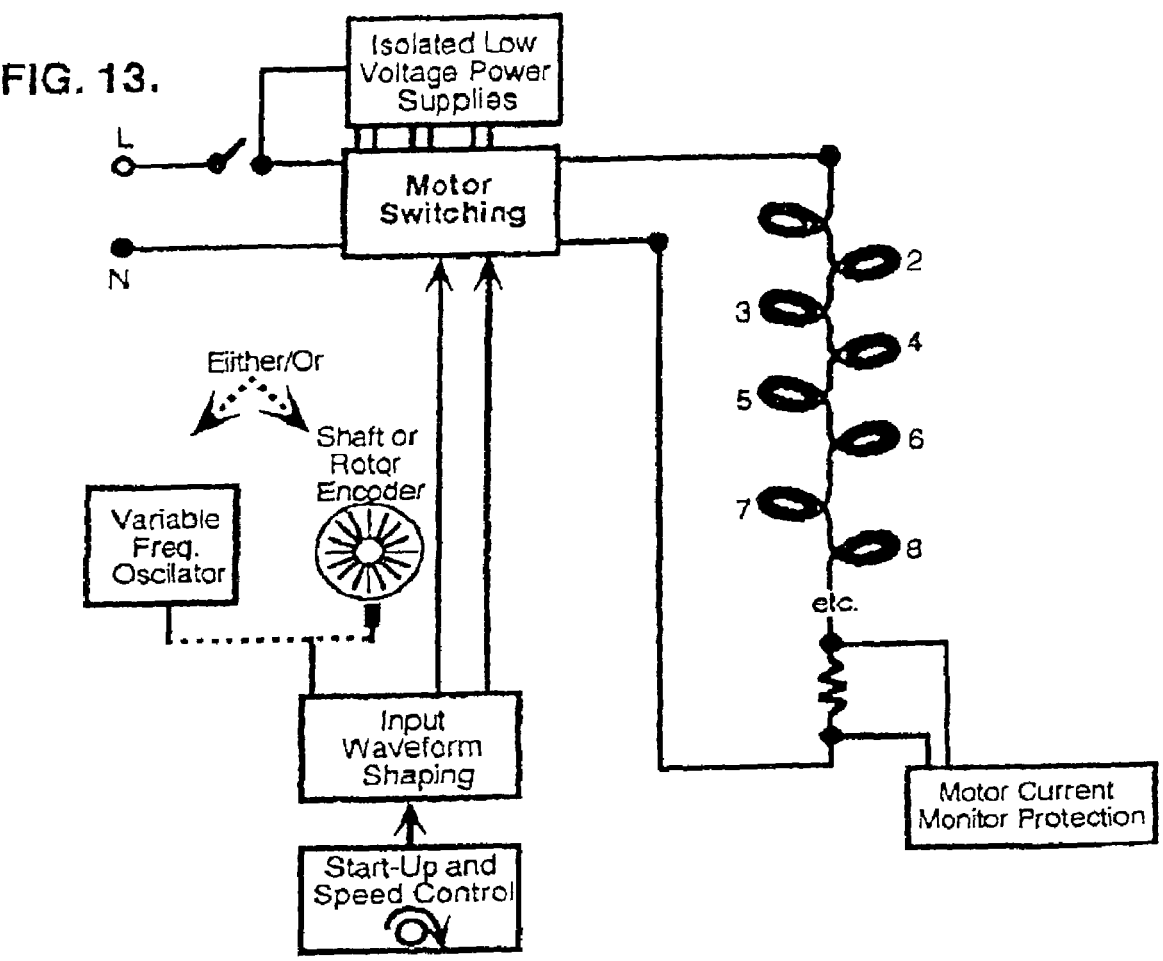
FIG. 13 illustrates a circuit for use with the magnet version of the invention.

In FIG. 13, a standard H-bridge circuit is illustrated which may be used with the motor of the invention having an optional control of the circuit, either from closed-loop rotor feedback circuits or from an open control by means of a variable frequency oscillator. The efficiencies are slightly higher with the closed-loop control, but in many applications, the open control gives the desired control characteristics with only a few percent lower efficiency. The closed-loop control also offers speed control by means of an optional speed control circuitry. This circuit in FIG. 13 is to be used with the magnet version described above of the single field rotor motor.

Figure 14:
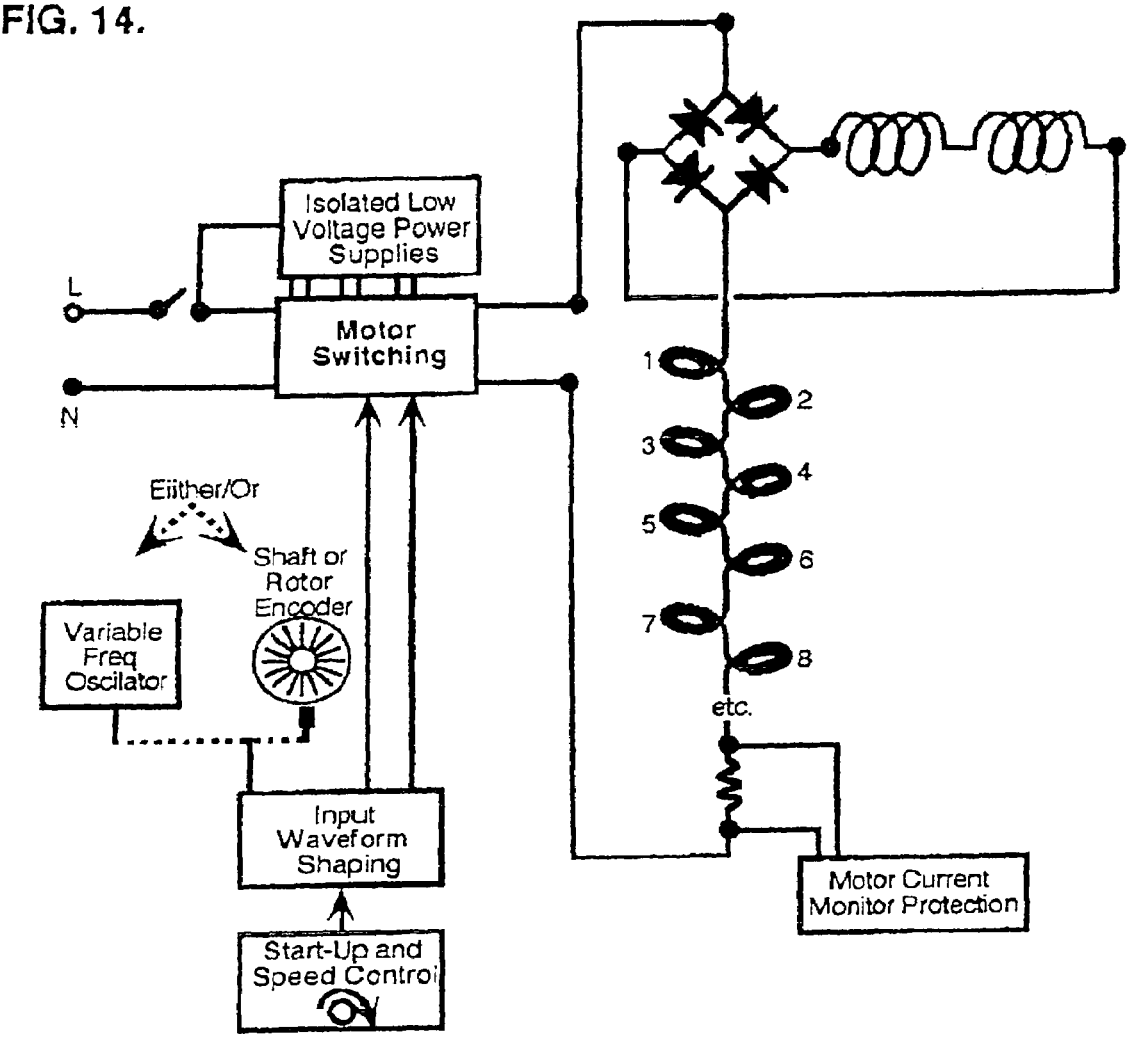
FIG. 14 discloses a circuit similar to that of FIG. 13 which may be used with the DC coils version of the invention.

In FIG. 14, the same circuit as shown in FIG. 13 is illustrated with the addition of a bridge circuit in series with the phase coils for driving the two DC coils on the stator endbells of the single field rotor motor version that replaces the stator magnets with DC coils wrapped on cores formed into the endbells of the motor as described above.

Figure 15:
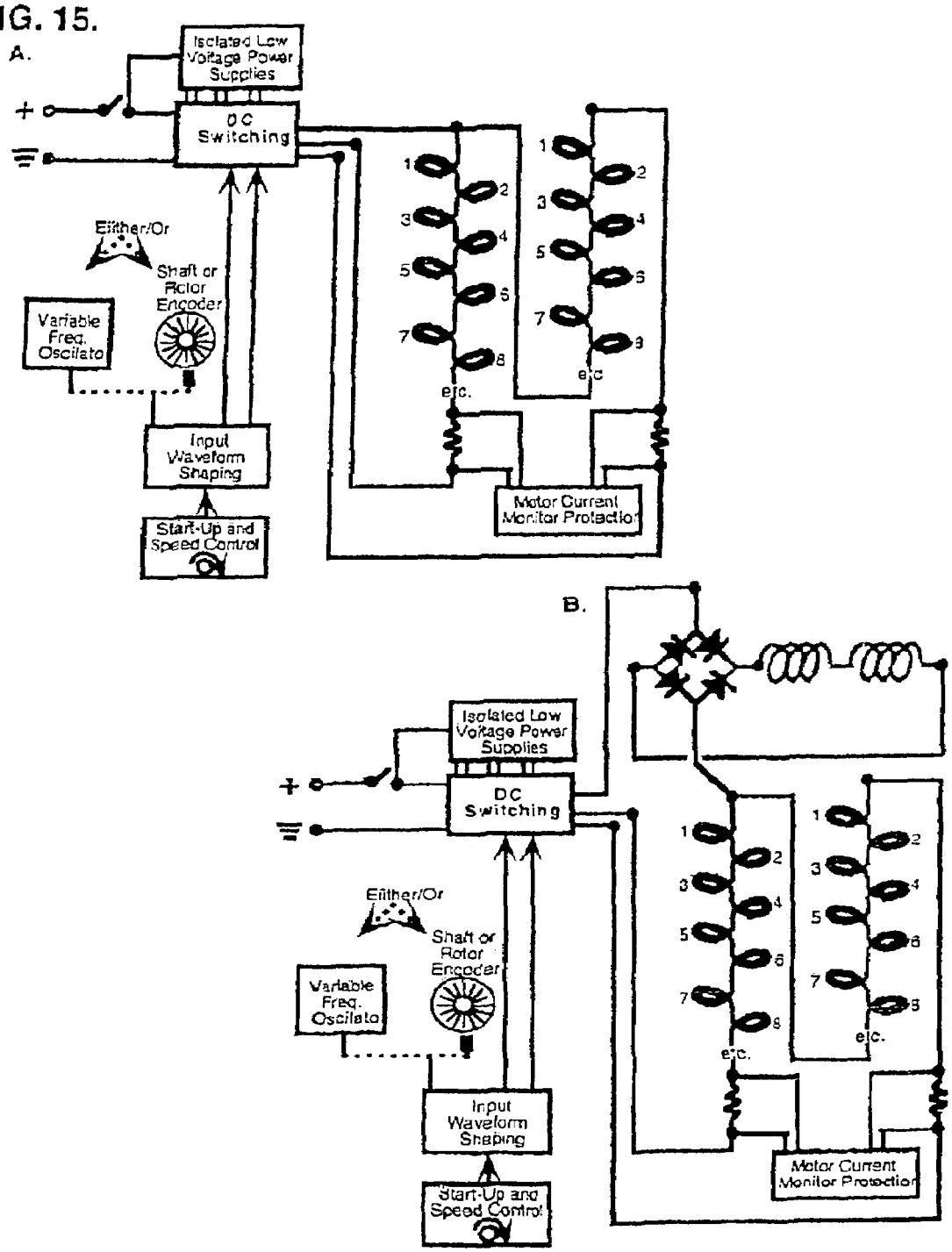
FIGS. 15A-15B show circuits which may be used with the single field rotor motor of the invention of the bifilar-type drive.

FIGS. 15A-15B show a third and fourth kind of circuit which can be used to drive the single field rotor motor. These circuits are bifilar circuits. Accordingly, two identical wires are wound on the phase coils at the same time. Both sets of resulting windings are connected to a DC controller that has two separate DC circuits that can be alternated either by closed-loop or open controls. The two separate windings are connected 180° electrically opposite to each other and are used alternately to create one of the opposing half-phases. Thus, when the first circuit is powered by the controller, a North-South pattern as previously described is created around the inside face of the laminated stator poles. When the second circuit is powered, each pole is reversed and creates the alternate pattern. These are alternated by the controller to cause the motor to run in the normal manner. This bifilar circuit is useful for applications where inexpensive circuits are needed for the application. These circuits can also offer very inexpensive speed control.

The difference between FIG. 15A and FIG. 15B is that FIG. 15A is for the magnet version of the single field rotor motor of the invention, and FIG. 15B is for use with the DC coil version that uses DC coils instead of magnets on the stator endbells. As will be appreciated, FIG. 15B includes a bridge circuit and two DC coils not illustrated in FIG. 15A.

Figure 16:
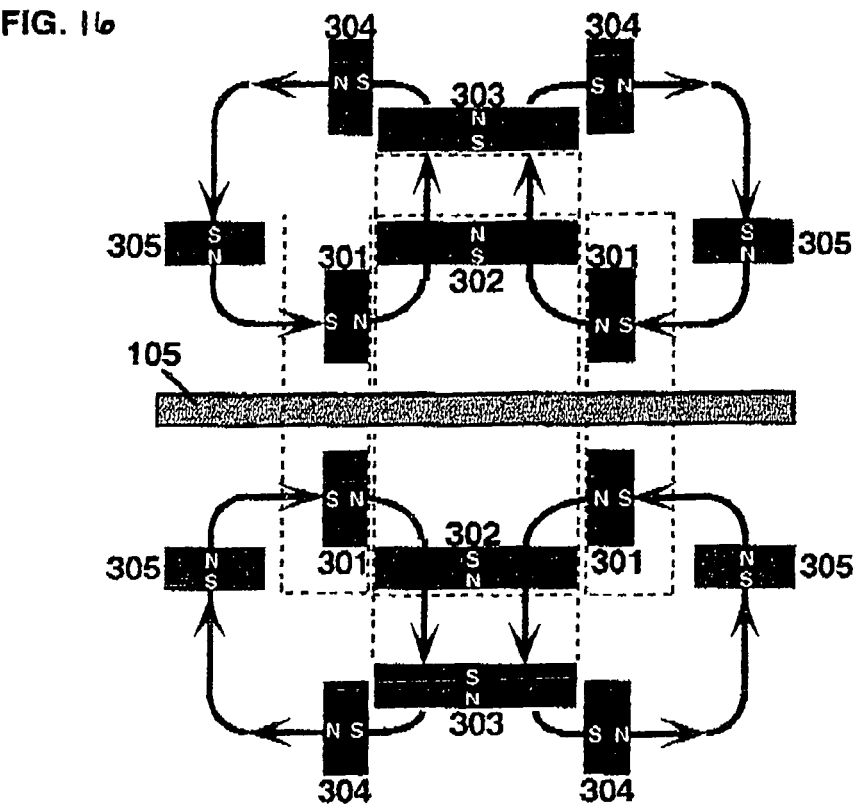
FIG. 16 illustrates a typical flux configuration in a single-field rotor motor in accord with the present invention, wherein alternative magnet positions are shown.

Once these kinds of flux circuits are understood and utilized, in motor design and if certain parameters are observed, it is possible to move the magnets in the system almost anywhere in the flux path and create, maintain and utilize this type of radial/axial flux torque circuit. In particular, FIG. 16 shows a plurality of possible permanent magnet locations 301-305. A first magnet location 301 represents the placement of the magnets on the stator endbells. It is possible to bond the donut type magnet on the other side of the axial air gap to the rotor itself, thus placing the air gap between the outside face of the magnet in each case and the respective stator endbell. This, of course, indicates that the magnet will now rotate with the rotor as it is bonded to its sides. This has been done by the inventors with very good results, and in some applications, it can be desirable. It provides slightly higher flux density for the same magnet material in the rotor pole faces due to the fact that there is no air gap between the rotor poles and the inside faces of the magnets. In the previous example where the magnets were on the endbell, there are two air gaps between the magnets and the rotor: axial air gaps between the rotor sides and the inside magnet faces and radial air gaps between the rotor poles and the stator poles which provide direct motor steel paths through themselves, the housing, and the endbells to the outside faces of the stator magnets.

A second magnet location 302 indicates that the magnets can be moved to the outside diameter of the rotor and there mounted by bonding so that there are spaces between the magnets nearly equal to the magnets circumferential width, thereby forming rotor poles and pole faces. All the magnets are mounted and magnetized so that they have the same magnetic polarity on all the rotor pole faces they form around the outside diameter of the rotor.

If this is done correctly, the normal air gap between these magnet rotor pole faces and the stator pole faces, which is about 0.007 to 0.010 of an inch, will provide the path of least resistance to the magnet flux to complete its circuit. Thus, the magnet flux will then use the same path as in the previously discussed designs and will pass through the stator poles, the stator back iron, the stator housing, and endbells. The magnet flux will then pass from the inside faces of the endbells, which will have been formed so that they provide a pole face near the sides of the rotor, and back into the iron core of the rotor and return to the bonded, inside face of the rotor magnets, thus completing the motor radial/axial flux circuits as in the other designs.

This design has been used by the inventors with very good success, and the motor retains its torque and efficiency characteristics as in the previously discussed embodiments. The advantage of this placement of the magnets is that maximum flux density from the magnets is present in the rotor poles as the magnets themselves compose the various rotor poles. Another advantage is that this higher flux density allows the rotor magnets to have a greater influence on the stator poles. Since there are no magnets magnetically oriented on the rotor to attract the flux from any other magnet on the rotor, none of the flux shunts back to the source magnet only by means of the rotor, and thus, the full flux potential of the rotor magnets is focused toward the stator poles. This allows the cancellation of the flux path by the stator phase coils (stator armature coils) of any one set of the two sets, to repel the magnet rotor poles while not actually reversing the laminated iron of the stator poles in that set. Instead, the stator poles are returned to an approximately neutral magnetic state because of the off-setting magnetic influence of the stator phase coils on those poles in the set and the magnet rotor poles on the stator pole set. The result is a full repulsion of the magnet rotor poles from the out-of-phase stator armature coil set while not reversing the laminated motor steel of that pole set but merely returning it to approximate magnetic neutral. The benefit is that the stator pole sets have less eddy current potential induced into them, and there is less energy differential between the two phases of the stator poles in each set. Thus, there is less energy required from the stator coils and less loss in the stator system, while maintaining a full torque differential between the two stator pole sets and the magnet rotor poles. This is true because the in-phase stator armature coil set enhances the motor flux circuit path in that pole set, while the out-of-phase stator armature coil set effectively resists the presence of the flux circuit. It has been observed that resisting the presence of the permanent magnet rotor flux circuit in one set of stator poles and enhancing it in the other set, causes the full torque potential of the rotor magnets to be realized without having to reverse the out-of-phase pole set pole-cores to an equal and opposite flux intensity.

This effect also points to the fact that the flux circuits that are set up in the stator, the housing, and the rotor core by the rotor magnets, not only never alternate, but equally, they are never broken. When one set of the stator phase coils resist, and thus repel, the magnet rotor circuits and the other set accepts and enhances them, the flux circuits are not broken but merely induced to "stretch" and chase magnetic alignment with the constantly advancing in-phase areas of the stator, thus causing torque between the stator and rotor. This effect, coupled with the previous fact that the stator poles never reverse polarity but merely fluctuate between being in-phase magnetically with the rotor magnets by means of the rotor magnets and stator phase coils series-ed influence, or to a near magnetic neutral by means of the off-setting influence of the stator phase coils and the rotor magnets, points to the very excellent performance characteristics of this motor system.

Figure 17:
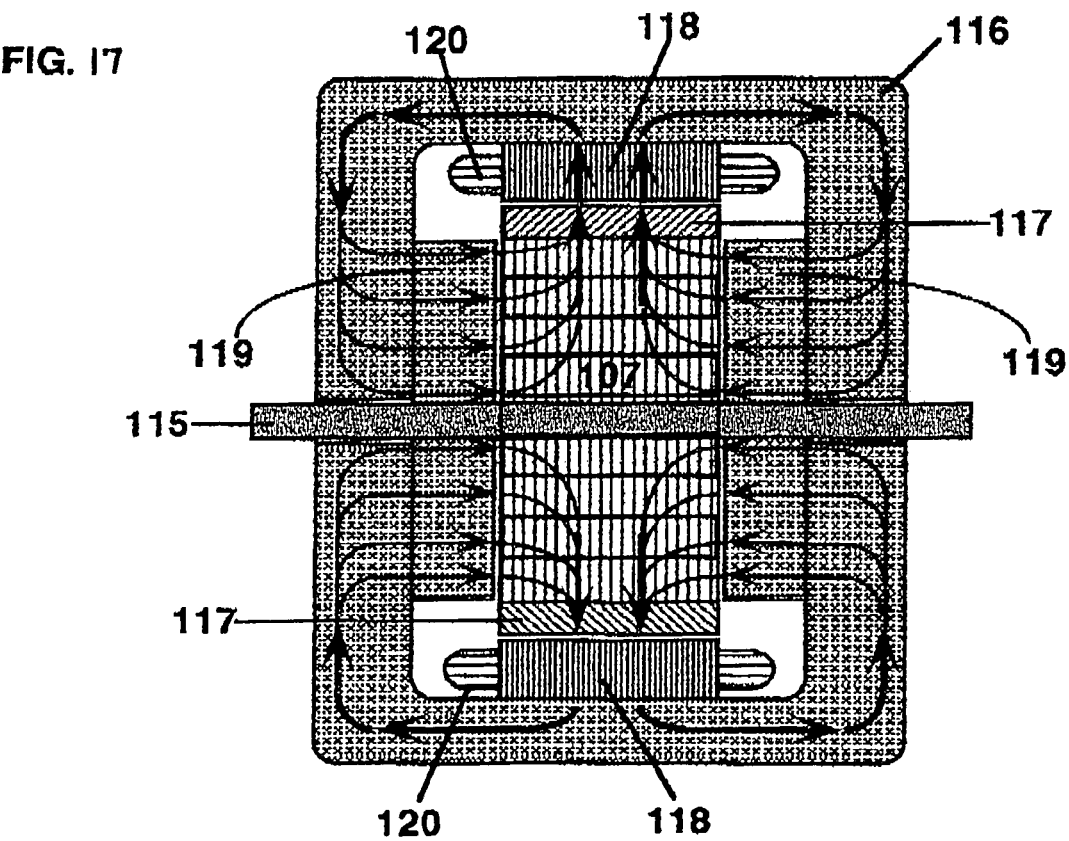
FIG. 17 illustrates an embodiment of the single-field rotor motor of the present invention having rotor-mounted magnets.

In FIG. 17, such a design is illustrated wherein the rotor core 107 is mounted on a shaft 115 for rotation with respect to a housing 116 and a laminated stator 118, wherein magnet poles 117 are bonded to the rotor core 107, which can be laminated or solid. The arrowed lines illustrate the basic characteristics of the flux circuits set up in the laminated stator 118, the housing 116, the endbells, and the rotor core 107 by the magnet poles 117. Of course, as in the previous designs, the number of magnet poles 117 on the rotor 107 would be half the number of magnetic stator poles on the stator 118. In order to provide a non-expansing (constant), minimum axial air gap for the rotor magnet flux circuits, the endbells have poles 119 which each have a face near the rotating axial sides of the rotor core 107. Every other design characteristic of the motor illustrated in FIG. 17 is exactly like the previous motor illustrated in FIG. 3, and the operation of the stator phase coils 120 (armature coils) is the same.

In FIG. 16, other placements for the magnets within the restrains of this kind of radial/axial flux circuits, have been illustrated. A third magnet location 303 would actually be a radially-oriented magnet between the laminated stator and the motor housing: one magnetic face around the outside diameter of the laminated stator and the other magnetic face inside the motor housing. This works well as it gives an increase of magnetic material in the flux circuits, but it is not as cost-effective as the previous designs because it is not an efficient use of magnet material in the motor design. A fourth magnet location 304 and a fifth magnet location 305 are also obviously within the flux circuit parameters, but have been ruled out due to other design issues. Such magnet locations have been shown to further illustrate how the radial/axial flux configuration can be created almost anywhere within the circuit path if the proper orientation of the polarity of the magnets at each position is observed in order to keep the circuits properly formed and non-alternating.

In all these designs, two air gaps for any one flux circuit which is composed of one non-expanding air gap between the rotor sides and the endbells, and one expanding and diminishing air-gap between the rotor poles and the stator poles, is present. This is quite unique as most all motor designs have two expanding and diminishing air gaps in the flux circuits providing torque in the motor and do not provide for one of the air gaps to be constant, minimum, and non-expanding.

Figure 18:
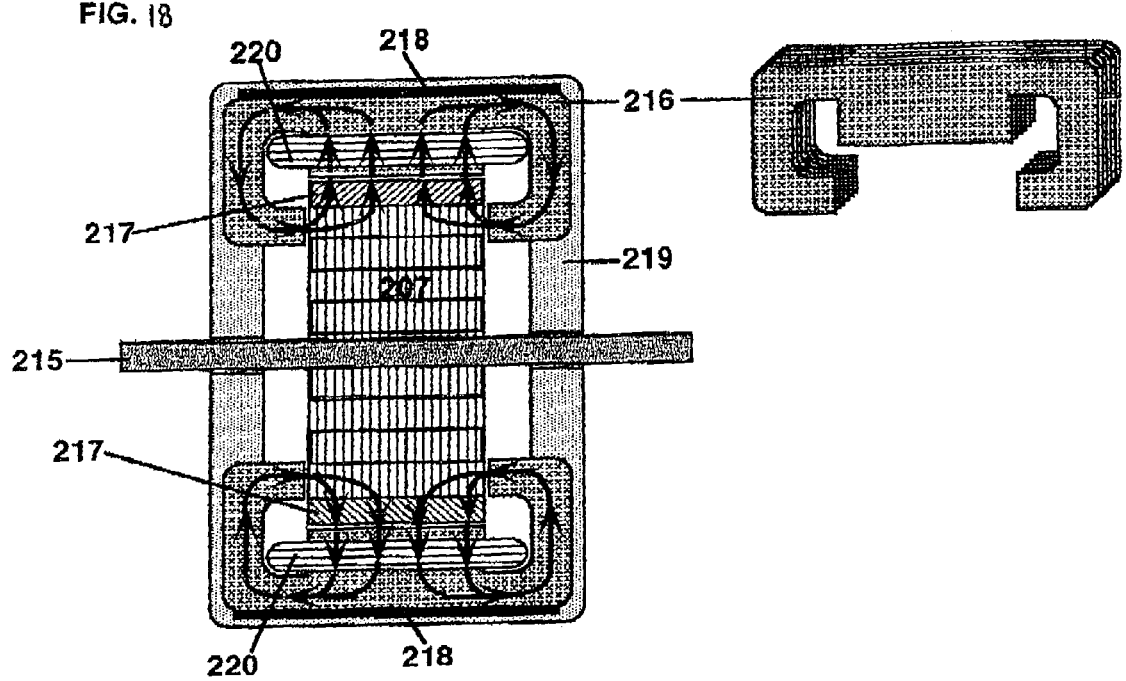
FIG. 18 illustrates an embodiment of the single-field rotor motor of the present invention having rotor-mounted magnets and a segmented stator.
Figure 19:
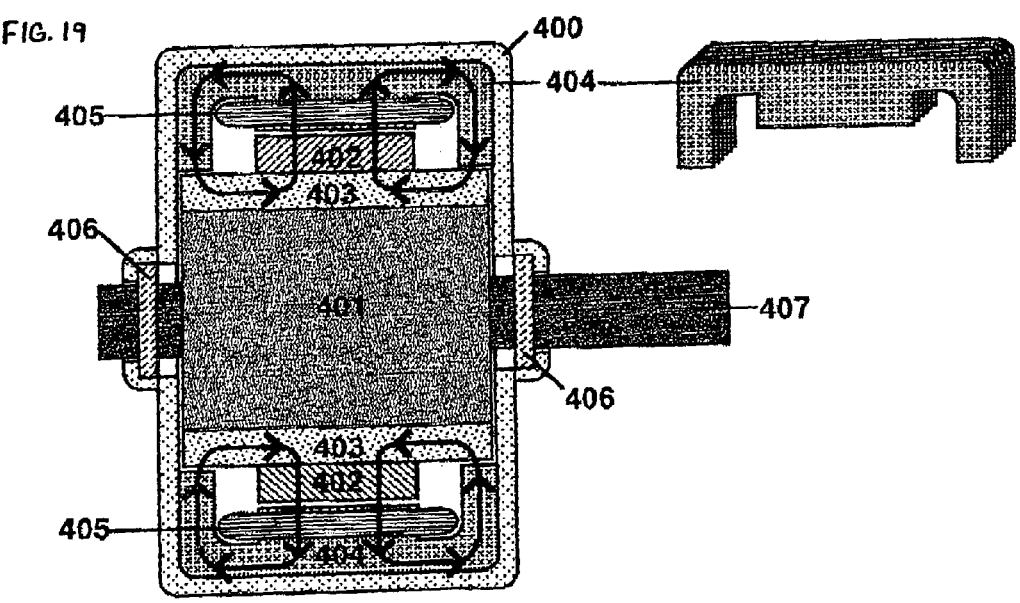
FIG. 19 illustrates an embodiment of the single-field rotor motor of the present invention having rotor-mounted magnets and a segmented stator, wherein a radial flux return path is provided.

In FIGS. 18-19, an alternate stator design, which also works well with the magnet-poled version of this motor as illustrated in FIG. 17, is shown. In FIGS. 18-19, a segmented stator is formed where the stator poles are individual laminated units that are laminated radially and have pole extensions on each side to provide the return path for the magnet flux circuits back to the rotor core.

As shown in FIG. 18, a rotor 207 is mounted on shaft 215 for rotation with respect to a stator pole assembly 216 and a housing 219. The individual, laminated stator pole assembly 216 is pictured in the motor and in the set-out drawing. As can be seen by the arrowed lines that indicate the flux circuits in the stator pole 216, and by the rotor 207, set up by the rotor magnets 217, the full return path for the permanent magnet flux circuit back to the rotor core 207 is provided by the laminated stator poles 216 by means of the extensions on the poles 216 which provide the magnetic circuit path. This design allows the motor housing 219 to be made of something nonmagnetic, such as appropriate temperature-tolerant plastics or fiberglass. The housing 219 can be injection molded or drop molded and is designed to provide hollows into which the laminated stator poles 216 are fitted and held. In some cases, a wrap 218 fabricated from several wraps of coated motor steel, such as is used to make stator laminations, is wrapped around the outside back of all the stator poles 216 between their backs and the inside of the plastic motor housing 219. This wrap 218 provides magnetic paths for the interaction of the stator coils 220 with each other, thus providing a shorter total air gap for the out-of-phase flux in the out-of-phase pole set by shunting the back outside of all the poles 216 together. However, since the off-setting effect of the magnetic influence of the rotor magnets 217 and the stator phase coils 220 causes the out-of-phase stator pole set to seldom set up any flux path, but merely return the out-of-phase pole set to an approximate magnetic neutral, this wrap 218 is not strictly necessary and is not always desirable since the benefits are small.

Each stator pole 216 in this design is fitted with its own phase coil (stator armature coil) 220, and the number of individual poles and coils is determined by supplying twice the number of stator poles as there are rotor magnet poles; i.e., 6 rotor magnet poles, 12 stator poles; 8 rotor magnet poles, 16 stator poles; etc.

As shown in FIG. 19, the rotor 401 and the individual stator poles 404 may be designed to provide a non-expanding, minimum radial air gap for the flux return path instead of an axial air gap. This allows any side forces on the rotor 401 and at the bearings 406 on the shaft 407 caused by very strong permanent magnet flux circuits when very strong magnets are used (such as NdFeB), to be eliminated in favor of easier to control radial forces. This design change is accomplished by extending the rotor core material 403 axially wider than the magnets 402 used to make the rotor poles. This core material 403, which is soft motor steel, preferably, not laminated, on which the rotor magnets 402 are mounted, serves to provide a radial face on the outside edges of the rotor 401, suitable for replacing the rotor sides for flux transfer from the air gap, as in the previous designs. The pole extension of individual stator poles 404 are designed with a downward radial face that is mounted so that this face is around 0.007 to 0.010 inches from the rotating surface on the radial sides of the rotor core 403. This provides the non-expanding, minimum air gap that the single field rotor motor system requires, and it reconfigures the air gap forces on the rotor so that they are radial not axial, while preserving the radial/axial magnetic flux circuits in the motor. As described with regard to the embodiment shown in FIG. 18, the housing 400 may be fabricated from a nonmetallic material. Furthermore, the stator coil 405 is constructed and operates as previously described.

Figure 20:
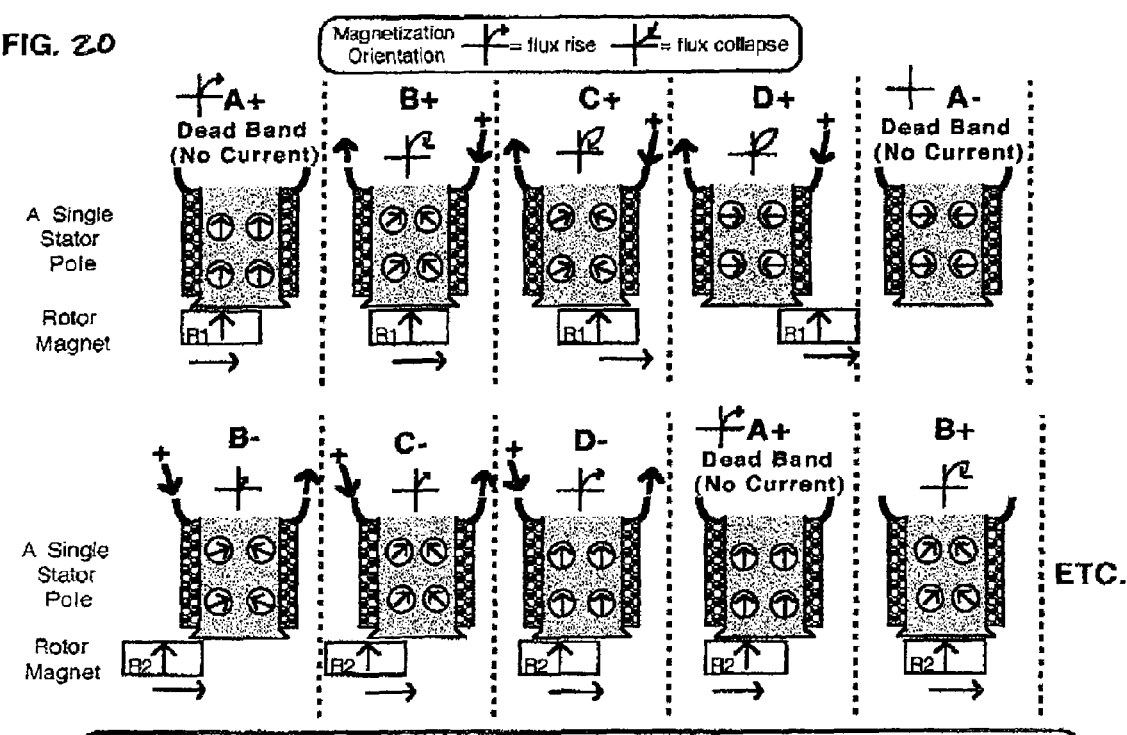
FIG. 20 illustrates the magnetization polarization of the stator poles in the single-field rotor motor of the present invention.
Figure 21:
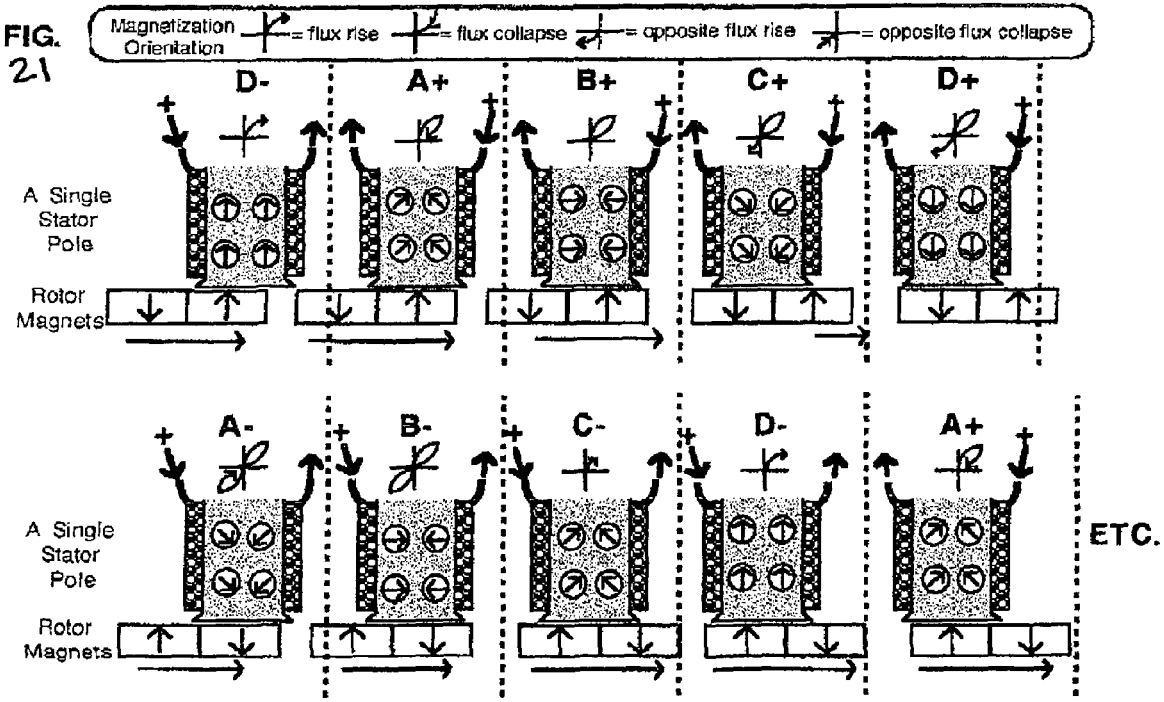
FIG. 21 illustrates the magnetization polarization of the stator poles in a conventional brushless DC motor that uses alternating magnet poles on the rotor.

FIGS. 20-21 illustrate the difference in the magnetization polarization of the stator poles in the single field rotor motor and in a conventional brushless DC motor that uses alternating magnet poles (both North and South faces) on the rotor. In FIG. 20, the magnetization polarization of the poles in the single field rotor motor is illustrated. Two forms of indication of the magnetic orientation and saturation are used in the figures: (1) above each phase of the stator pole, a common magnetization curve graph is used which indicates orientation of the magnetizing force and saturation of the pole; and (2) within the stator pole depicted are circles with arrows in them which indicate the direction and movement of the magnetization of the stator pole. If the arrows are pointing fully up, they indicate full saturation and the direction of magnetization. As the arrows rotate toward opposing horizontal positions, they indicate a falling saturation and a neutral magnetization when the pole arrows have reached horizontal. In FIG. 21, it has been necessary to show a complete reverse of the arrows from up to down to indicate the 180° alternation in the magnetic orientation of the pole in the alternate half-phase. In each FIG. 20 and FIG. 21, the direction of current is indicated by the direction of the arrows at the end of the coil leads at the top of the pole. Also a "+" has been added to indicate electrical polarity (traditional electric current flow from positive to negative is utilized). The magnetic orientation of the rotor magnets are indicated by the arrow on the rotor magnet. In FIG. 20, since all the rotor magnets of the single field rotor motor are oriented the same, successive rotor poles are designated R1 and R2, to illustrate which is indicated. In each figure, a single stator pole is illustrated through several steps of magnetic saturation as the two half-phases of the electric current alternate from positive to negative. The direction of movement of the rotor magnet is indicated by the arrow below the rotor magnet.

In FIG. 20, A+ shows that the feedback circuit to the motor (not shown) of the single field rotor motor is causing a dead band (a momentary non-application of current to the phase coils). The orientation of the stator pole is shown to be in-phase with the rotor magnet pole which is due to the magnetic influence of the magnet rotor pole which is using this stator pole as part of its magnetic flux circuit and also, due to the orientation imposed on the stator pole by the phase coil in the previous electrical half-phase. The saturation is seen to be at maximum as the magnet rotor pole face is moving into full register with the stator pole face.

In B+, as the magnet rotor pole comes into register with the stator pole, current is applied to the phase coil by the motor feedback circuit. As indicated by the magnetization curve graph and by the rotation of the arrows in the circles toward opposing positions, the saturation of the stator pole has begun failing. This imposed neutralizing effect by the stator phase coil causes the rotor magnet to start repelling the stator pole as the flux circuit the magnet is creating is being rejected. This is further facilitated by the fact that the stator pole just ahead (not shown), in the direction of rotation of the rotor magnet pole, is attracting the flux circuit created by the rotor magnet pole.

In C+, the rotor magnet pole begins to repel the stator pole. As the rotor magnet pole moves out of register with the stator pole, the stator pole increasingly moves toward neutral magnetization which causes more rejection of the rotor magnet pole flux circuit.

In D+, as the rotor magnet pole moves away, but is still partly in register with the stator pole, the stator pole reaches neutral magnetic orientation. This is due primarily to the fact that the influence of the rotor magnet pole and the stator pole phase coil are about equal on the stator pole due to the slight lagging of the pole behind the rotor movement due to the magnets former influence. At this point, the stator phase coil starts to reverse the stator pole to the opposite magnetic orientation than first indicated, but the dead band is imposed by the feedback circuit, as indicated in A−. It is quite easy to place the dead band properly in the phasing due to the fact that once the stator pole reaches neutral, the primary influence of the rotor magnet pole in inducing a back emf on the phase coil is spent. It is important at this point, to insert some facts about the magnet generation on the stator poles and coils in order for this point to be fully appreciated.

When the current is first applied to the stator pole, as in B+, the current in the coil rises very quickly, as the stator pole is already held near saturation by the rotor magnet pole. However, there is still some movement of the permanent magnet flux circuit in through the coil into the stator pole. When the current is applied to make the stator coil out-of-phase with the magnet flux circuit, the rotor magnet is still moving some of the permanent flux circuit into the stator pole. Since the magnet is dominate, as its flux circuit is always at full strength and is now at its closest proximity, and the stator coil is only now beginning its out-of-phase half-cycle, the effect is to generate a forward emf momentarily into the stator coil (remember that attracting a permanent magnet flux circuit into a coil will generate a back emf on the coil as the magnet flux cuts the coil turns as it enters into the core, and if you reverse the polarity of that same coil to repel that same permanent magnet flux circuit when established in the coil core, the magnet will generate the opposite emf leaving the core of the coil as it cuts through the turns of the coil and this too will be a back emf in relation to the now reversed current in the coil).

But, when the magnet of the rotor is moving closer and closer to the coil and increasing the strength of the permanent magnet flux circuit in the pole of the coil during the dead band period (as in A+), then to reverse the coil to resist the magnet flux circuit while the magnet moves to its closest proximity and point of greatest influence on the stator pole core, and it continues to momentarily impose lines of flux through the turns of the coil, the result is that the magnet flux momentarily generates a forward emf in the coil during the first few milliseconds of current application. This allows the voltage applied to the coil to cause the current in the coil to rise very quickly, as there is no back emf, and the presence of the forward emf tends to cancel much of the self-inductance impact of the coil on the current. Under these conditions, the voltage can be very efficient in raising the current level in the stator phase coil. Due to this effect, a very "healthy" current flow is established very quickly in the stator coil with a very vertical front-end waveform if observed on an oscilloscope. However, the magnet flux circuit will immediately begin to be repelled by the stator phase coil on the pole (C+) as the current rises, and the stator phase coil and pole forward in the direction of rotation will begin to attract the rotor magnet pole flux circuit. This will result in the flux circuit of the magnet pole moving through the turns of the stator phase coil it is leaving and through the turns of the oppositely oriented phase coil pole/core it is entering. This will generate a very powerful back emf on all the phase coils and this will drive the current down very quickly. If the voltage is low in relation to the load on the rotor and its rpms, the current will often be driven very quickly to zero. However, if the voltage is increased in relation to the load and rpms of the rotor, the current in the middle of the waveform, and progressively toward the back part of the waveform, will begin to rise. The voltage, load, and rpms can continue to be increased until the rise in the waveform reaches its highest point on the very back edge of the waveform and fills the whole time period allowed for that half cycle.

At the point where most of the rotor permanent magnet pole flux circuit has exited the stator pole in question (D+), the current will begin once again to rise due to the absence of any generation of back emf. At the same time, the other set of stator poles is at the point where the coil flux has brought the stator pole to a saturation level which is leading the saturation effect of the approaching rotor pole flux circuit, and these stator coils will begin to have a very sharp rise in current. Due to this taking place at the end of one mechanical half-phase, it does little good for the current to be increased in the coil (it can even be detrimental), so the dead band is imposed at this point by the feedback circuit. This happens at the end of the half-phase, and the dead band allows the magnet saturation effect to "catch up" in the other pole set's magnetization and even begin to increase it as it moves into register.

However, the pole in question of the first set is now ready to attract the next rotor magnet (R2) which is of the same polarity as the one it just repelled. So the current is reversed (B−), and the process just described is repeated in reverse with the same results as just described electrically, and the stator pole moves through C− and D− toward full saturation and then back to the A+ dead band where this description began.

In FIG. 21, the differences between the characteristics of the single field rotor motor and the common brushless DC motor configuration, which used both North and South magnet poles on the rotor, can be appreciated as the same evaluation criteria are applied in FIG. 21 to the brushless DC torque system as those applied to the single field rotor motor torque system in FIG. 20. As can be seen in D– of FIG. 21, the stator pole is at full saturation due to the rotor magnet and the in-phase magnetic orientation of the stator pole coil. In A+, the current in the stator pole coil is reversed as the magnet pole is coming into register with the stator pole, and the stator pole core begins to move toward neutral magnetization due to the increasing rejection of the rotor magnet pole flux circuit by the coil.

In B+, as the first rotor magnet pole starts to move out of register with the stator pole, the core of the stator pole reaches neutral magnetization due to the near equal off-set effect between the stator coil and the first rotor magnet. In C+, due to the continuing influence of the stator coil and the increasing influence of the second rotor magnet, which has opposite polarity to that of the first, coming more fully into register with the stator pole, the core of the stator pole begins to magnetically saturate in the opposite direction to the first direction of orientation as shown in D–.

In D+, the increasing influence of the second rotor magnet establishing its flux circuit in the stator pole as it comes more fully into register with the stator pole and the continuing influence of the stator coil, brings the core of the stator pole to full saturation. In A–, the current is reversed as this magnet pole is moving into full register, and due to the influence of the stator coil, the core of the stator pole begins to move toward magnetic neutral. In B–, magnetic neutral is achieved, and in C–, the re-magnetization of the core of the stator pole in the opposite direction to previous now begins under the influence of the stator coil and the third approaching rotor magnet. In D–, this orientation is brought to full saturation as this new magnetic pole of the rotor is coming near to full register with the stator pole face and due to the continued influence of the stator coil. In the last frame, A+ shows the re-magnetization beginning all over again.

As can be seen in FIG. 21, the core of the stator pole goes through a complete collapse of its first magnetic orientation and a reversal of the core to full saturation in the opposite direction; and then a complete collapse of this second magnetic orientation and a reversal back to the first magnetic orientation, etc. Because the core of the stator poles are magnetically reversed in this manner, more energy is lost in the stator and rotor system and more eddy currents are created. Both of these contribute to less efficiency being obtained. Because the return path for the rotor magnet flux circuits is only through the pole faces of the stator poles and the face of the adjacent rotor magnets, there is more of a collapsing of the rotor magnet flux circuits from out of the stator poles resulting in a less efficient movement of the torque flux between the poles.

From the above illustrations and description, it will be appreciated that a unique flux pattern and stator force is created to produce a rotating, electric motor. It is to be understood that the inventive concepts of the present invention are defined by the scope of the following claims and revisions and improvements which may be apparent to those skilled in the art are considered to come within the scope of the following claims and the scope of the claimed language.

What is claimed is:

1. A single field rotor motor comprising:
   a stator having a plurality of stator poles, each of said stator poles having a coil for creating a magnetic pole force;
   a rotor mounted for rotation with respect to said stator and having a plurality of circumferentially spaced salient rotor poles formed thereon;
   magnetic means for creating a pair of magnetic flux fields wherein interaction of said pair of magnetic flux fields causes said magnetic flux fields to spray radially outward with respect to said rotor, thereby creating uniform magnetic polarity on said rotor poles; and
   circuit means for alternately charging said stator coils to alternate the polarity of a given stator pole to alternately attract and repel said rotor poles to produce rotation of said rotor.

2. The single field rotor motor stated in claim 1, further comprising:
   said stator poles numbering twice the number of rotor poles.

3. The single field rotor motor stated in claim 1, further comprising:
   a small, changing, radial air gap between said stator poles and said rotor.

4. The single field rotor motor stated in claim 1, further comprising:
   said stator having extensions for transferring magnetic flux between said stator and rotor across a small, unchanging, radial air gap.

5. The single field rotor motor stated in claim 1, further comprising:
   said stator having extensions for transferring magnetic flux between said stator and rotor across a small, unchanging, axial air gap.

6. The single field rotor motor stated in claim 1, further comprising;
   a stator housing fabricated from a magnetically non-conductive material; and
   each said stator pole having a laminated, modular stator section.

7. The single field rotor motor stated in claim 1, further comprising:
   said pair of magnetic flux fields are substantially toroidal.

8. The single field rotor motor stated in claim 1, further comprising:
   a stator housing fabricated from a magnetically conductive material for transferring magnetic flux between said stator and said rotor.

9. The single field rotor motor stated in claim 1, said magnetic means comprising a plurality of magnets circumferentially spaced around said rotor.

10. A single field rotor motor comprising:
    a stator having a plurality of stator poles, each of said stator poles having a coil for creating a magnetic pole force;
    a rotor mounted for rotation with respect to said stator and having a radial periphery having a plurality of circumferentially spaced magnets to define a plurality of spaced salient rotor poles of uniform magnetic polarity, there being twice the number of stator poles than rotor poles, and a small, changing, radial air gap between said stator poles and said rotor poles;
    circuit means for alternately charging said stator coils to alternate the polarity of a given stator pole to alternately attract and repel said rotor poles to produce rotation of said rotor; and
    a pair of magnetically conductive pole surfaces positioned adjacent to opposite axial ends of said rotor for transferring magnetic flux from said stator to said rotor across a small, unchanging axial air gap.

11. The single field rotor motor stated in claim 10, further comprising:

a stator housing fabricated from a magnetically conductive material for transferring magnetic flux between said stator and said rotor.

12. The single field rotor motor stated in claim 10, further comprising:

a stator housing fabricated from a magnetically non-conductive material; and each said stator pole having a laminated, modular stator section.

13. The single field rotor motor stated in claim 12, further comprising:

said stator having extensions for transferring magnetic flux between said stator and rotor across a small, unchanging, radial air gap.

14. The single field rotor motor stated in claim 12, further comprising:

said stator having extensions for transferring magnetic flux between said stator and rotor across a small, unchanging, axial air gap.

15. The single field rotor motor stated in claim 10, further comprising:

adjacent rotor poles of said plurality of rotor poles having equal spacing.

16. The single field rotor motor stated in claim 10, further comprising:

adjacent stator poles of said plurality of stator poles having equal spacing.

17. The single field rotor motor stated in claim 1, further comprising:

a pair of magnetically conductive pole surfaces positioned adjacent to opposite axial ends of said rotor for transferring magnetic flux between said stator and said rotor across a small unchanging axial air gap.

* * * * *